US011502828B2

(12) United States Patent
Androulaki et al.

(10) Patent No.: US 11,502,828 B2
(45) Date of Patent: Nov. 15, 2022

(54) AUTHENTICATING CHAINCODE TO CHAINCODE INVOCATIONS OF A BLOCKCHAIN

(71) Applicant: International Business Machines Corporation, Armonk, NY (US)

(72) Inventors: Elli Androulaki, Zürich (CH); Angelo De Caro, Zürich (CH); Fabian Portmann, Zürich (CH); Alessandro Sorniotti, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 1184 days.

(21) Appl. No.: 15/813,267

(22) Filed: Nov. 15, 2017

(65) Prior Publication Data
US 2019/0149321 A1     May 16, 2019

(51) Int. Cl.
 H04L 9/08     (2006.01)
 H04L 9/06     (2006.01)
 G06F 21/60    (2013.01)
 H04L 9/14     (2006.01)
 H04L 9/32     (2006.01)
 H04L 9/00     (2022.01)

(52) U.S. Cl.
 CPC .......... H04L 9/085 (2013.01); G06F 21/602 (2013.01); H04L 9/0643 (2013.01); H04L 9/14 (2013.01); H04L 9/3239 (2013.01); H04L 9/50 (2022.05)

(58) Field of Classification Search
 CPC ... H04L 9/0816; H04L 9/0819; H04L 9/0838; H04L 9/0894; H04L 63/062
 See application file for complete search history.

(56) References Cited

U.S. PATENT DOCUMENTS

| 9,448,798 | B1* | 9/2016 | Bose ................. G06F 9/30043 |
| 9,635,000 | B1  | 4/2017 | Muftic |
| 9,774,578 | B1* | 9/2017 | Ateniese ............. H04L 9/0643 |
| 2016/0180338 | A1 | 6/2016 | Androulaki et al. |
| 2016/0358169 | A1 | 12/2016 | Androulaki et al. |
| 2017/0149819 | A1 | 5/2017 | Androulaki et al. |
| 2017/0155515 | A1 | 6/2017 | Androulaki et al. |
| 2017/0344988 | A1* | 11/2017 | Cusden .................. H04L 63/12 |
| 2017/0352027 | A1* | 12/2017 | Zhang .................. H04L 9/0825 |
| 2018/0343114 | A1* | 11/2018 | Ben-Ari ................... H04L 9/06 |
| 2019/0052461 | A1* | 2/2019 | Kreder, III ......... G06Q 20/3829 |

OTHER PUBLICATIONS

C. Christian, Architecture of the Hyperledger Blockchain Fabric, IBM Research—Zurich, Jul. 2016. Retrieved from Internet using: https://pdfs.semanticscholar.org/f852/c5f3fe649f8a17ded391df0796677a59927f.pdf.

(Continued)

Primary Examiner — Daniel B Potratz

(57) ABSTRACT

An example operation may include one or more of creating a shared secret via a blockchain node member, storing the shared secret in a memory outside the blockchain, and sharing the shared secret with one or more other blockchain node members during a setup phase of an execution environment associated with a chaincode.

14 Claims, 6 Drawing Sheets

(56) References Cited

OTHER PUBLICATIONS

R. Guerraoui, M. Pavlovic, and Seredinschi, Incremental Consistency Guarantees for Replicated Objects, Proceedings of the 12th USENIX Symposium on Operating Systems Design and Implementation (OSDI '16), Nov. 2-4, 2016, Savannah, GA, USA. Retrieved from internet using: https://www.usenix.org/system/files/conference/osdi16/osdi16-guerraoui.pdf.

W. Li, A. Sforzin, S. Fedorov, and G. O. Karame, Towards Scalable and Private Industrial Blockchains, 2017 Proceedings of the ACM Workshop on Blockchain, Cryptocurrencies and Contracts, Abu Dhabi, United Arab Emirates, Apr. 2-2, 2017, pp. 9-14. Retrieved from internet using: http://www.ghassankarame.com/BCC17_Blockchain.pdf.

\* cited by examiner

US 11,502,828 B2
// 1

AUTHENTICATING CHAINCODE TO CHAINCODE INVOCATIONS OF A BLOCKCHAIN

TECHNICAL FIELD

This application generally relates to authenticating in a blockchain, and more particularly, authenticating chaincode-to-chaincode invocations of a blockchain.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary.

Certain blockchain configurations are setup according to chaincode data, which is the source of commands and other logic used to enable operation of a blockchain. In general, chaincode is a term used to identify logic stored, distributed and executed in a blockchain network configuration. Certain blockchain configurations require chaincode-to-chaincode 'cc2cc' invocation operations. Chaincode-to-chaincode (cc2cc) invocation represent ways for one chaincode, such as that of the 'caller' to invoke another chaincode, such as that of the 'callee'. Authentication of the invocation operation is performed based on a received messge proposal that triggered the initial invocation. In summary, unless the chaincode, associated with the callee, shares the same set of 'readers' (i.e., entities that have the privilege to invoke a chaincode) as the caller 'readers', then cc2cc invocation will fail. One approach is to ensure that a list of 'readers' of the caller and of the callee match. However, this may be undesirable because the two chaincodes may belong to different channels. The channels may represent independent instantiations of a blockchain each of which has its own ledger, a set of chaincode and a set of entities. As a result, the readers may differ for a legitimate reason, such as from a security standpoint.

SUMMARY

One example embodiment may provide a method that includes one or more of creating a shared secret via a blockchain node member, storing the shared secret in a memory outside the blockchain, and sharing the shared secret with one or more other blockchain node members during a setup phase of an execution environment associated with a chaincode.

Another example embodiment may include an apparatus that includes a processor configured to perform one or more of create a shared secret via a blockchain node member, store the shared secret in a memory outside the blockchain, and share the shared secret with one or more other blockchain node members during a setup phase of an execution environment associated with a chaincode.

Yet another embodiment may provide a non-transitory computer readable storage medium that includes a processor configured to perform one or more of creating a shared secret via a blockchain node member, storing the shared secret in a memory outside the blockchain, and sharing the shared secret with one or more other blockchain node members during a setup phase of an execution environment associated with a chaincode.

DETAILED DESCRIPTION

Figure 1:
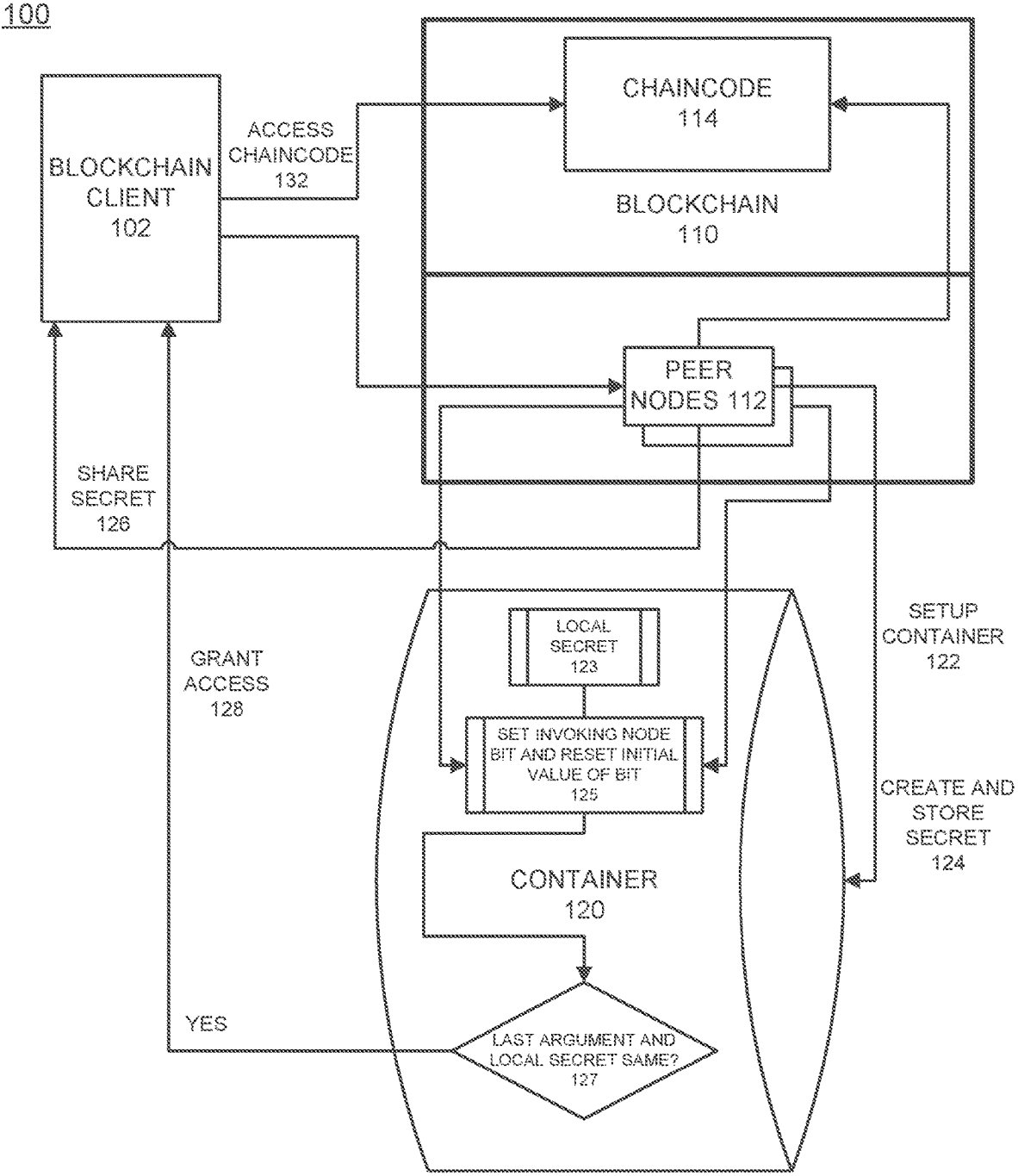
FIG. 1 illustrates a logic diagram of processing a query and establishing accountability via a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to authenticating chaincode-to-chaincode invocations in a blockchain, and in another embodiment relates to using a shared secret to limit chaincode invocation to privileged parties.

According to example embodiments, extending access control of chaincodes of a blockchain may include a "same invoking node". A blockchain peer(s) may be enabled to reliably and securely determine whether a cc2cc invocation originated from a same node, or more precisely, by a chaincode operation occurring on the same node. The way that the same invoking node principle can be established, upon a chaincode invocation routine, is by a shared secret between caller chaincode and callee chaincode. The shared secret may be securely conveyed in the course of the cc2cc invocation by way of a chaincode argument. The caller adds this argument and the callee verifies it against its own copy of the chaincode. The shared secret is not stored in the blockchain shared ledger and should withstand chaincode upgrades. The shared secret should also be secure, not easily extracted, hard to guess, and require minimal changes to the chaincode and/or the chaincode infrastructure and no special interaction of the chaincode developer. Ultimately, the approach should reliably and securely establish that a chaincode invocation comes from the same node.

According to example embodiment, a setup phase may include a peer node(s) generating, at startup, a shared secret in its own memory or in a memory location outside the blockchain. The secret may have a minimum security requirement, such as having 128 bits or more of entropy, or in general, to be guessable with probability comparable to $2^{lambda}$, where 'lambda' is the security parameter of the application. The secret is conveyed at chaincode startup time to the executable environment or 'container' that runs the chaincode by having the peer set a variable in the environment of the container, and having the chaincode search for this variable in its own initialization function. In the event that no such variable is present, an empty string is returned so no failure necessarily occurs. The variable may be referred to as a local secret. The chaincode may set a bit, which is called the same invoking node bit and the initial value is reset. Then, during a cc2cc invocation event, on the caller side, the local secret may become the (n+1) argument to the cc2cc invocation event, where 'n' is the number of arguments. On the callee side, the last argument is removed and its value is compared, bit-by-bit, to the local secret, and when the comparison is successful, meaning the last argument is equal to the local secret, the same invoking node bit is set. The chaincode can then check the value of the same invoking node bit and make an access control decision based on the result.

A chaincode, also sometimes referred to as smart contract, is a computer program that runs in the distributed operating environment provided by the blockchain system. A chaincode can embed any business logic, from the negotiation of insurance contracts, procurement processes, etc., to the exchanges over a supply-chain or business network to the transfers of assets. A chaincode invocation is basically a request message sent to the chaincode to perform an operation. For instance, if the chaincode embeds the logic of negotiating contracts, an invocation may be a request to start a new negotiation, or to resume and terminate a previously instantiated contract. A query may be an invocation of a chaincode that is "read-only". A normal invocation may change the state of the blockchain system, but a read-only invocation does not make actual changes, instead the query type of invocation only returns some function of the existing state, leaving it untouched and unmodified.

A transaction proposal is a message that triggers an execution of a chaincode. For instance, a remote function call or remote procedure call may be transaction proposal, which is triggered by a message. The invoked function may be read-only (i.e., a query) or may write to the system state, which would make it a regular transaction type. The system state, world state or state of the system are all terms used to identify all information written to the ledger. The system state starts empty (no blocks in the ledger) and grows and changes over time as more blocks are committed to the ledger. A normal transaction is eventually committed to the ledger since it usually changes its state. A query on the other hand does not change the state of the system, and so there is no reason to actually commit it to the ledger. One concern with auditing is that when a read-only query is not committed to the ledger then there is no trace of the query on the ledger, and thus there can't be any accountability even in a non-changing type of transaction, such as the query. For example, if a read-only function (query) on a chaincode is invoked then it retrieves the response, learns it, and then discards it. In this example, there is no trace of this action every happening. Later on, in a dispute, the query submitting party can always deny having performed that query, and there is no information on the ledger to disprove the party's assertions.

A proposal response is a result of the chaincode invocation, for example, a remote function call or remote procedure call that would be the result sent back to the initial invoker. Normal queries conventionally send the whole result not just a hash of the result. This approach of only using the hash is one example approach according to example embodiments. A key-value store can be modeled as follows: err <-PUT(key, value). This function permits a user to associate the byte array "value" to the string "key" value; and <-GET(key) is a function which permits the retrieval of the byte array associated to the string "key". As a result, being indexed by a hash implies that a call to PUT(H(result), result) will result.

A read once property implies that the query result data is deleted after the hash is decrypted with a key. This feature of the system amounts to requiring that the GET function deletes the value associated with the key after returning the value. In operation, a client submits a query, receives the hash and then submits a transaction to the blockchain with the bit set. The peers (one or more) may observe the bit, and this triggers the query data being decrypted/retrieved so the peer would observe the bit and the hash. The peer would then query the internal read-once key value store, issue a get(hash) and return the value. The read-once properties of this function would ensure that a subsequent call to get (hash) would return no data. A lookup key in a key-value store may provide an argument to get and the first argument to put. In one example, an associative array associates something, such as the key string to something else (i.e., the value) so that the value can be retrieved by providing the key string. In this example, the lookup key is the hash value, and the peer receives a transaction that is committed to the ledger with the bit set and a hash. Then the peer can perform the lookup in the internal key-value storage, using the hash as the lookup key to retrieve the associated value.

FIG. 1 illustrates an example logic diagram of a chaincode authentication configuration according to example embodiments. Referring to FIG. 1, the system 100 includes a blockchain client 102 seeking access to chaincode 114 of the blockchain 110. Peer nodes 112 may regulate the access by creating and storing a secret 124 in a container 120 during a setup procedure 122. The secret may be shared 126 with the client 102. The container 120 may have a local secret 123 stored and a procedure for setting an invoking node bit and resetting the initial value of the bit 125. A determination may be made as to whether a last argument identified is the same 127 as the local secret 123. If so, the access may be granted 128 to the requesting entity. The client may then be able to access the chaincode 132.

Figure 2:
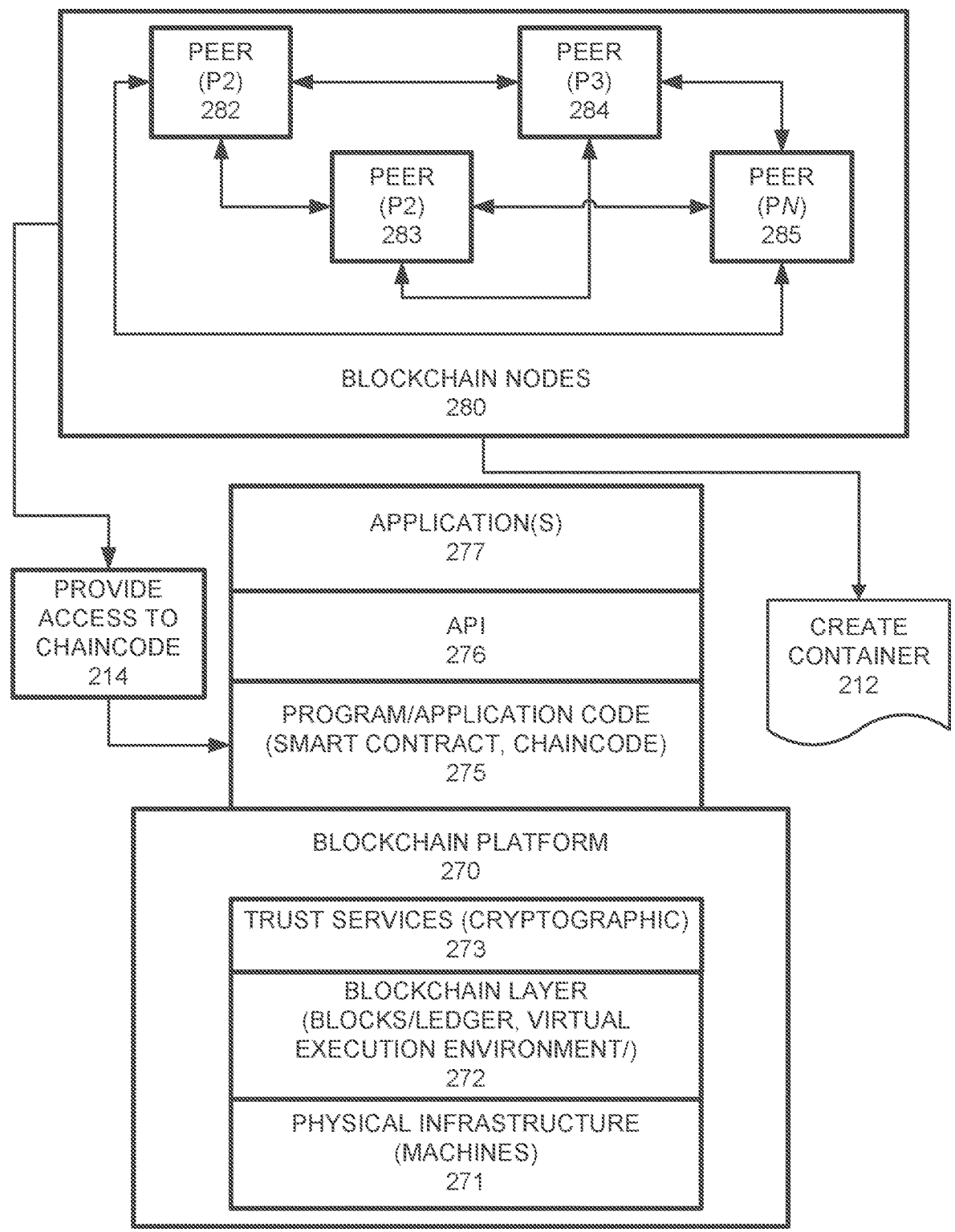
FIG. 2 illustrates an example blockchain configuration for performing query accountability, according to example embodiments.

FIG. 2 illustrates an example blockchain configuration for performing the query authentication and accountability function, according to example embodiments. Referring to FIG. 2, the blockchain system 200 may include certain common blockchain elements, such as a group of blockchain nodes 280, which may be assigned peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

As described herein, a smart contract is an executable code which is registered, stored, and replicated with a blockchain (e.g., distributed network of blockchain peers). A transaction is an execution of the smart contract code which can be performed in response to conditions associated with the smart contract being satisfied. The executing of the smart contract may trigger a trusted modification to a state of a digital blockchain ledger. The modification to the blockchain ledger caused by the smart contract execution may be automatically replicated throughout the distributed network of blockchain peers through one or more consensus protocols.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, the peers may setup a new container 212. The result may include the peers offering access 214 to certain nodes from the blockchain computing environment (VM) to access chaincode 275 provided that a last argument is the same as the local secret stored in the container.

Figure 3:
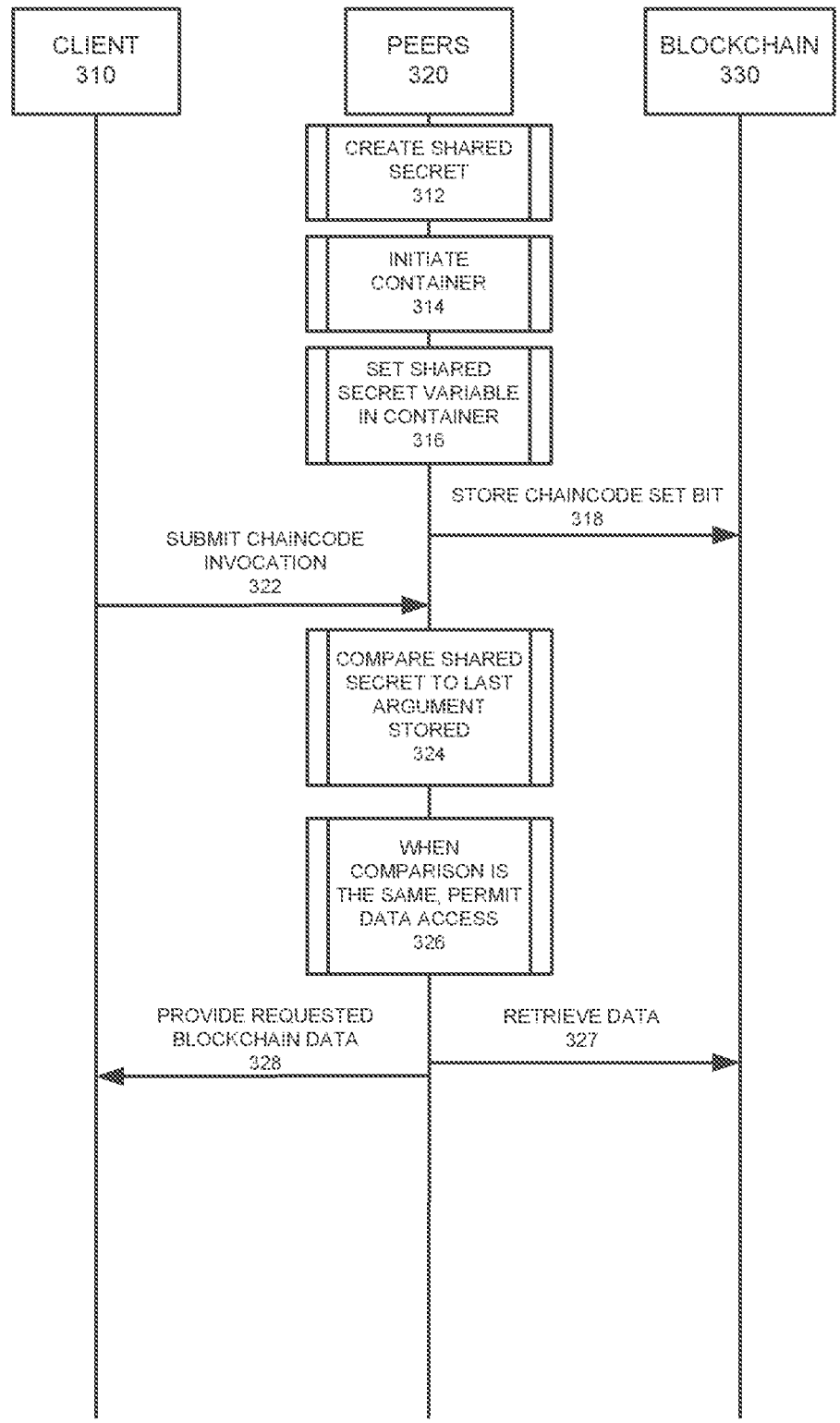
FIG. 3 illustrates a system messaging diagram for processing a request for blockchain access and establishing accountability, according to example embodiments.

FIG. 3 illustrates a system messaging diagram of an example chaincode invocation authorization process according to example embodiments. Referring to FIG. 3, the system 300 may include a client device 310 seeking access to chaincode in the blockchain 330. The peers 320 may proceed by creating a shared secret 312, initiating a container 314 and setting a shared secret variable in the container 316, which then provides a set bit being stored 318 in the blockchain 330. Subsequently, a client 310 may seek blockchain data via a chaincode invocation 322 which stems from a data request. The shared secret may then be compared 324 to the last argument stored for comparison purposes and via a bit-by-bit comparison. When the result of the comparison is the same for both, the data access 326 may result in permitting data access for the request. The data is then retrieved 327 and provided 328 to the client 310.

Figure 4A:
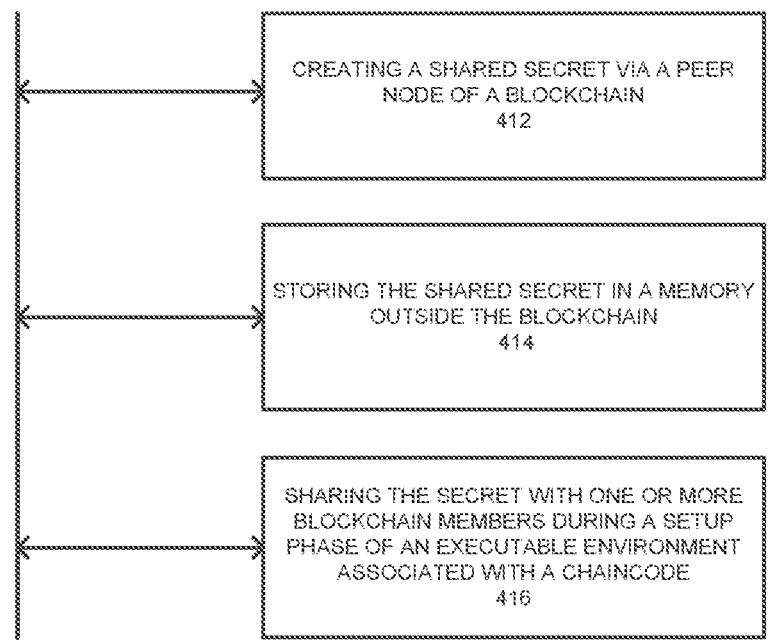
FIG. 4A illustrates a flow diagram of an example method of managing query requests, according to example embodiments.

FIG. 4A illustrates a flow diagram of an example method of managing query requests, according to example embodiments. Referring to FIG. 4, the method 400 may provide creating a shared secret via a peer node of a blockchain 412, storing the shared secret in a memory outside the blockchain 414, sharing the secret with one or more blockchain members during a setup phase of an executable environment associated with a chaincode 416. The method may also include, responsive to occurrence of the setup phase of the container, searching for a variable in the container via a chaincode operation, wherein the variable specifies a local secret. The method may also include, responsive to a failure to identify the variable, returning an empty set. The method may also provide, responsive to occurrence of the setup phase of the container, setting an invoking node bit value via a chaincode operation and resetting an initial value of the bit and setting the local secret to a next value argument (n+1), where a value of 'n' is a number of arguments in the chaincode, and removing a last argument from the chaincode, and comparing the last argument bit-by-bit to the local secret, and when the value of the last argument and the local secret are the same, setting the invoking node bit value. The method may also provide, responsive to determining the value of the last argument and the local secret are the same, granting access to a caller and callee to invoke the chaincode.

Figure 4B:
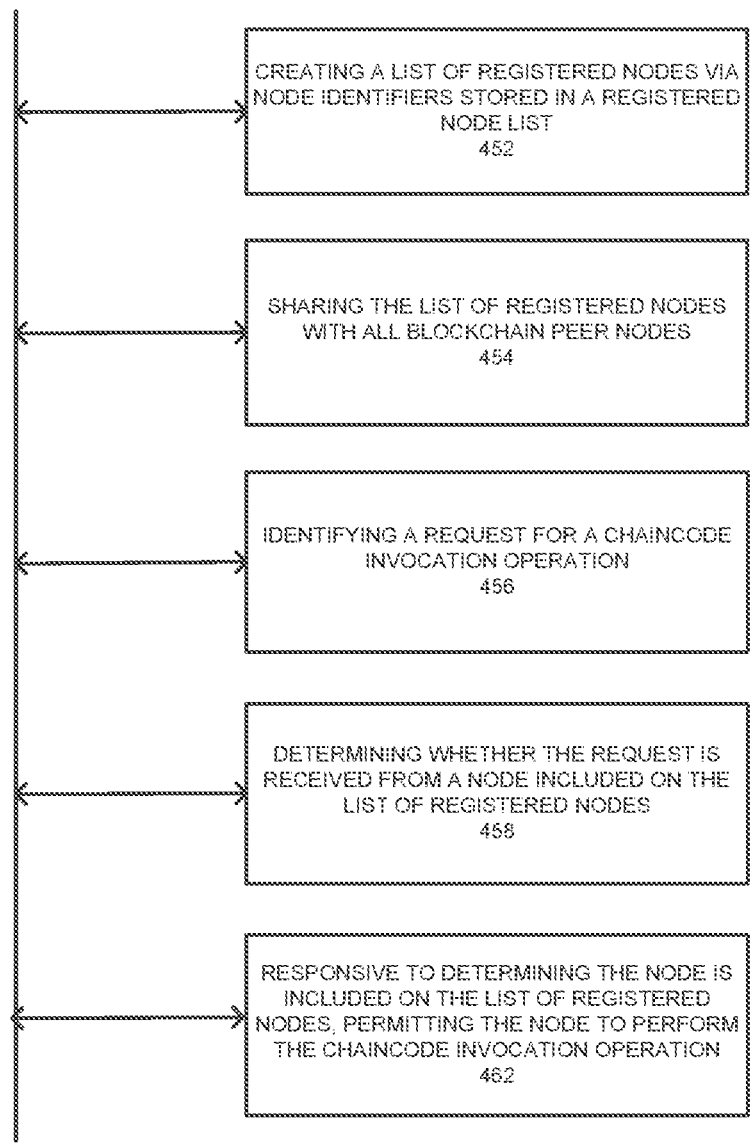
FIG. 4B illustrates another flow diagram of an example method of managing query requests, according to example embodiments.

FIG. 4B illustrates another flow diagram of an example method of managing query requests, according to example embodiments. Referring to FIG. 4B, the method 450 may include creating a list of registered nodes via node identifiers stored in a registered node list 452, sharing the list of registered nodes with all blockchain peer nodes 454, identifying a request for a chaincode invocation operation 456, determining whether the request is received from a node included on the list or registered nodes 458, and responsive to determining the node is included on the list of registered nodes, permitting the node to perform the chaincode invocation operation 462.

In another example embodiment, the callee and/or caller may be identified and verified according to a pre-enlistment procedure. In this example, all such nodes seeking access to blockchain data and attempting to perform chaincode invocations must be verified prior to such privileged access. In this approach, the nodes are registered as selective members of a peer network of blockchain nodes. The registered nodes are identified by name or via another identifier, which are stored in a master list or grouping of such nodes, and which is share with all blockchain peer nodes. This approach ensures that any time any of the registered nodes attempt to perform such chaincode invocation operations, the nodes will be identified as being part or not part of the registered peer node list. In operation, the request for access may be received and cause a validation operation that attempts to link the node identifier of the requesting entity with a registered list of identifiers prior to permitting invocation rights.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
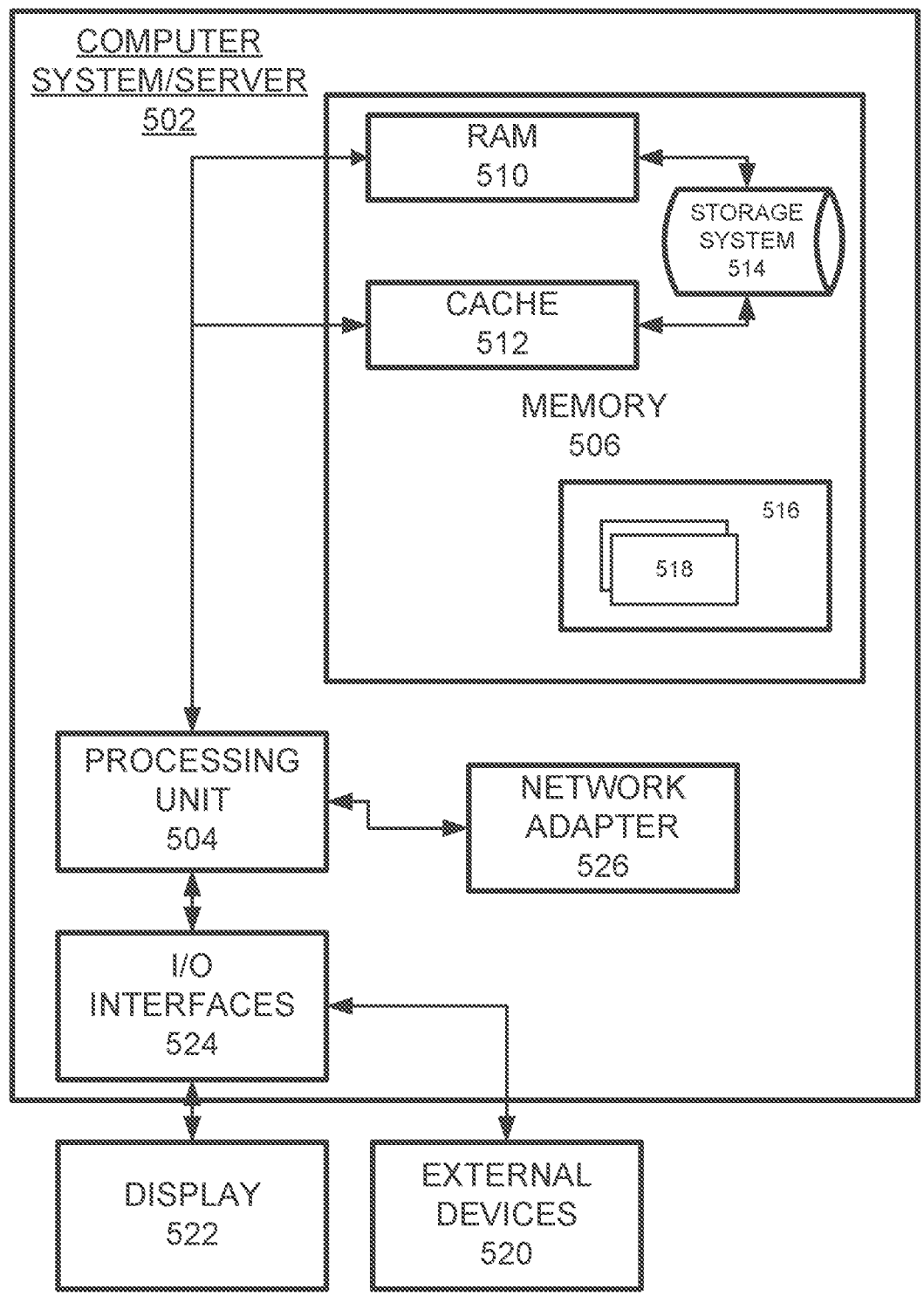
FIG. 5 illustrates an example network entity configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the various examples of the disclosed embodiments. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   creating, by a peer node of a blockchain, a shared secret;
   storing, by the peer node, the shared secret in a memory outside of the blockchain;
   sharing, by the peer node, the shared secret with a client node of the blockchain during a setup phase of an execution environment associated with a chaincode;
   responsive to occurrence of the setup phase of the execution environment, searching, by the peer node, for a variable in the execution environment via a chaincode operation, wherein the variable specifies a local secret having a next value argument (n+1), where a value of 'n' is a number of arguments in the chaincode; and
   permitting, by the peer node, the client to access the chaincode based on a comparison of the shared secret, provided in a request from the client node, to the shared secret stored in the shared memory.

2. The method of claim 1, further comprising: responsive to a failure to identify the variable, returning an empty set.

3. The method of claim 1, further comprising:
   responsive to occurrence of the setup phase of the execution environment, setting an invoking node bit value via a chaincode operation; and
   resetting an initial value of the invoking node bit value.

4. The method of claim 1, further comprising:
   removing a last argument from the chaincode;
   comparing the last argument bit-by-bit to the local secret; and when the value of the last argument and the local secret are the same, setting a value of an invoking node bit.

5. The method of claim 4, further comprising:
responsive to determining the value of the last argument and the local secret are the same, granting access to a caller and callee to invoke the chaincode.

6. An apparatus, comprising:
a processor of a peer node of a blockchain, the processor configured to:
create a shared secret;
store the shared secret in a memory outside of the blockchain;
share the shared secret with a client node of the blockchain during a setup phase of an execution environment associated with a chaincode;
responsive to occurrence of the setup phase of the execution environment, search for a variable in the execution environment via a chaincode operation, wherein the variable specifies a local secret having a next value argument (n+1), where a value of 'n' is a number of arguments in the chaincode; and
permit the client node to access the chaincode based on a comparison of the shared secret, provided in a request from the client node, to the shared secret stored in the shared memory.

7. The apparatus of claim 6, wherein the processor is further configured to:
responsive to a failure to identify the variable, return an empty set.

8. The apparatus of claim 6, wherein the processor is further configured to:
responsive to occurrence of the setup phase of the execution environment, set an invoking node bit value via a chaincode operation; and
reset an initial value of the node bit value.

9. The apparatus of claim 6, wherein the processor is further configured to:
remove a last argument from the chaincode;
compare the last argument bit-by-bit to the local secret; and
when the value of the last argument and the local secret are the same, set a value of an invoking node bit.

10. The apparatus of claim 9, wherein the processor is further configured to:
responsive to a determination that the value of the last argument and the local secret are the same, grant access to a caller and callee to invoke the chaincode.

11. A non-transitory computer readable storage medium configured to store one or more instructions that when executed cause a processor of a blockchain to perform:
creating, by a peer node of the blockchain, a shared secret;
storing, by the peer node, the shared secret in a memory outside of the blockchain;
sharing, by the peer node, the shared secret with a client node of the blockchain during a setup phase of an execution environment associated with a chaincode;
responsive to occurrence of the setup phase of the execution environment, searching for a variable in the execution environment via a chaincode operation, wherein the variable specifies a local secret having a next value argument (n+1), where a value of 'n' is a number of arguments in the chaincode; and
permitting, by the peer node, the client node to access the chaincode based on a comparison of the shared secret, provided in a request from the client node, to the shared secret stored in the shared memory.

12. The non-transitory computer readable storage medium of claim 11, wherein the instructions are further configured to cause the processor to perform:
responsive to a failure to identify the variable, returning an empty set.

13. The non-transitory computer readable storage medium of claim 11, wherein the instructions are further configured to cause the processor to perform:
responsive to occurrence of the setup phase of the execution environment, setting an invoking node bit value via a chaincode operation; and
resetting an initial value of the invoking node bit.

14. The non-transitory computer readable storage medium of claim 11, wherein the instructions are further configured to cause the processor to perform:
removing a last argument from the chaincode;
comparing the last argument bit-by-bit to the local secret;
when the value of the last argument and the local secret are the same, setting a value of an invoking node bit; and
responsive to determining the value of the last argument and the local secret are the same, granting access to a caller and callee to invoke the chaincode.

* * * * *